United States Patent
Ma et al.

(10) Patent No.: US 6,282,029 B1
(45) Date of Patent: Aug. 28, 2001

(54) COMPACT DISPLAY SYSTEM

(75) Inventors: Guolin Ma, Milpitas; Gary Dean Sasser, San Jose; Gani Jusuf, San Carlos, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/563,134

(22) Filed: May 2, 2000

(51) Int. Cl.[7] .................................................. G02B 27/14
(52) U.S. Cl. ........................ 359/629; 359/631; 359/633
(58) Field of Search ..................................... 359/629, 630, 359/631, 633, 857, 858, 859

(56) References Cited

U.S. PATENT DOCUMENTS

| | | | |
|---|---|---|---|
| 4,383,740 * | 5/1983 | Bordovsky | 359/631 |
| 5,408,346 * | 4/1995 | Trissel et al. | 359/65 |
| 5,585,946 * | 12/1996 | Chern | 349/5 |
| 5,596,451 | 1/1997 | Handschy et al. | 359/633 |
| 5,734,506 * | 3/1998 | Williams | 359/633 |
| 5,808,800 | 9/1998 | Handschy et al. | 359/630 |
| 6,130,784 * | 10/2000 | Takahashi | 359/630 |

* cited by examiner

*Primary Examiner*—Ricky Mack

(57) ABSTRACT

A display system has light source, display panel, conic mirror, and polarized reflector. The light from the light source is filtered by a diffuse reflective polarizer to contain light in a first linear polarization (for example, s-polarized light). That light is directed by the conic mirror toward the polarized reflector, and is reflected toward the display panel displaying images. The conic mirror and the polarized reflector is shaped such that the light telecentrically and uniformly illuminates the display panel. The light is reflected from the display panel being patterned by the image and rotated into a second linear polarization (for example, p-polarized light). The rotated light passes through the polarized reflector for viewing.

20 Claims, 3 Drawing Sheets

COMPACT DISPLAY SYSTEM

BACKGROUND

The present invention relates to image display systems. In particular, the present invention relates to miniature image display system usable for camcorders, digital cameras, or helmet-mounted displays and other wearable applications.

In the field of miniature image display systems there are continuing challenges to design smaller, lighter, and more energy efficient systems. These challenges stem from the fact that a miniature image display system should preferably be small enough and light enough to for digital cameras or camcorders, or be wearable (mounted on a helmet or on eyeglasses). Further, these goals should be preferably achieved without sacrificing image quality, in particular, contrast ratio and brightness. Such systems may be used for wearable computer systems, gaming systems, viewfinder for camera and camcorders, distance interactions between people or between people and machines, virtual-reality system, and for many other applications.

Typically, desktop computer systems and workplace computing equipment utilize CRT (cathode ray tube) display screens to display images for a user. The CRT displays are heavy, bulky, and not easily miniaturized. For a laptop, a notebook, or a palm computer, flat-panel display is typically used. The flat-panel display may use LCD (liquid crystal displays) technology implemented as passive matrix or active matrix panel. The passive matrix LCD panel consists of a grid of horizontal and vertical wires. Each intersection of the grid constitutes a single pixel, and is controlled by a LCD element. The LCD element either lets light through or blocks the light. The active matrix panel uses a transistor to control each pixel, and is more expensive.

The flat-panel display typically requires external lighting to allow human eyes to see the images displayed on the display panel. This is because flat-panel displays do not generate their own light. For laptop, notebook, or palm computers, external lighting is typically positioned at the back of the flat-panel. The backlighting allows the user to see the images from the front of the flat-panel.

The flat-panels are also used for miniature image display systems because of their compactness and energy efficiency compared to the CRT displays. For miniature image display systems, reflective lighting, rather than the backlighting, is preferred. This is because using the reflective lighting technique, miniature image display systems can be designed having higher energy efficiency compared to the energy efficiency of image display systems designed using the backlighting techniques. The passive matrix displays rotate s-polarized light into p-polarized light when the display is switched on while acting as a normal reflective surface when switched off. Various configurations of miniature display systems using flat-panel display and reflective lighting technique can be found in U.S. Pat. No. 5,808,800.

A typical example of a miniature display system 100 is illustrated in FIG. 1. Referring to FIG. 1, the light source 102 is typically one or more LED's (light-emitting diodes). To achieve uniform illumination to reflective type of display, the illumination must be both spatially and angularly uniform, with the angular extent given by the acceptance angle of the viewing optics. That is, preferably, the angle at which the light hits the special light modulator 104, or the display panel 104, is perpendicular to the plane of the display panel 104 and the filed angle of the viewing optics.

Typically, a collecting lens 106 is used to collect light from one or more light sources into a slightly convergent light beam to match the telecentricity of the viewing optics. And, an array of micro lenses or a diffuser 108 is used to provide diffusion. Because the light source 102, the collector 106, and the diffuser 108 are positioned on the sides of the display panel 104, the manufacturing of the system 100 is difficult and costly.

The light source 102 must be outside the field of view of a user so as not to block the image generated by the display. Therefore, a polarizing beam splitting cube ("PBS cube") 110 is often used is used to redirect the light. The PBS cube 110 includes a polarizing beam splitter (PBS) 112 which typically reflect s-polarized light while allowing p-polarized light to pass.

There are several problems associated with such design. Firstly, the bulk of the system 100 is difficult to reduce because distance between the first viewing optics and the display must be at least as great as the shortest dimension of the display. This is because the system 100 must allow sufficient space for the placement of the PBS cube 110.

Secondly, the bulk of the system 100 is difficult to reduce because the system 100 requires the use of the collecting lens 106 and the diffuser 108 for energy efficient operation. Generally, without the collecting lens 106 and the diffuser 108 much if not most of the light produced by the light source 102 would be wasted.

Thirdly, the bulk of the system 100 is difficult to reduce because the diffuser 108 must be at least as large as the display. This is because, in the illustrated prior art, the diffuser 108 is placed on the side of the collecting lens 106 which is the opposing side of the light source 102.

Finally, energy efficiency of the system 100 is low. There are several reasons for this. Reason one, only a portion 114 of the light from the light source 102 is captured by the collecting lens 106 and is directed toward the PBS cube 110. Some 116 of the light from the light source 102 is not captured by the collector 106 and is lost. This is because the light from the light source 102 is typically Lambertian. Lambertian light is light that is emitted in a radiation pattern in which the luminous intensity varies as the cosine of the off-axis angle, and is typically spread to about 120 degrees. In comparison, typical collection lens collects light for about 60 degrees.

Reason two, about ½ of the light 118 from the collector 106 and diffuser 108 is lost because the PBS 112 reflects only the s-polarized light. Accordingly, p-polarized light 120 is transmitted such that it will not each the display panel 104.

Reason three, after reflecting off the display panel 104, the light encounters the PBS 112 again. Again, only the p-polarized light 126 passes through the PBS 112 toward the optic lens 130 for viewing at an imaging area 132. All s-polarized light 128 is reflected by the PBS 112 and is lost.

Assuming that the collector 106 captures about ½ of the light produced by the light source 102, the system 100 of FIG. 1 allows only about ⅛ of the light produced by the light source 102 to eventually reach the optic lens 130. This is due to the combined losses at the collector 106 and at the PBS 112. This rough estimate does not take into account other losses. For example, energy is lost at the surface of the PBS cube 110 each time the light enters or leaves the PBS cube 110.

In sum, there exists continuing need for more compact, lightweight, and energy efficient display system that eliminates or minimizes these problems.

SUMMARY

These needs are met by the present invention. According to one aspect of the present invention, a display system has light source for producing light, display panel, conic mirror, and conic polarized reflector. The display panel is preferably coplanar with the light source, allowing less bulky configuration as well as for easier manufacturing process. The conic mirror directs the light from the light source toward the conic polarized reflector (CPR). The CPR reflects the directed light toward the display panel.

According to another aspect of the invention, a light reflector system for miniature display includes a conic mirror shaped to capture light from a light source and to direct the light toward a conic polarized reflector. The conic polarized reflector is shaped to reflect the directed light from the conic mirror to telecentrically impinge on a display panel.

According to yet another aspect of the invention, a display system includes light source for producing light, display panel, conic mirror to capture and direct the light, linear polarizer to filter the directed light, and conic polarized reflector to reflect the filtered light toward the display panel. The conic polarized reflector is shaped such that the filtered light uniformly and telecentrically impinges the display panel.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 1:
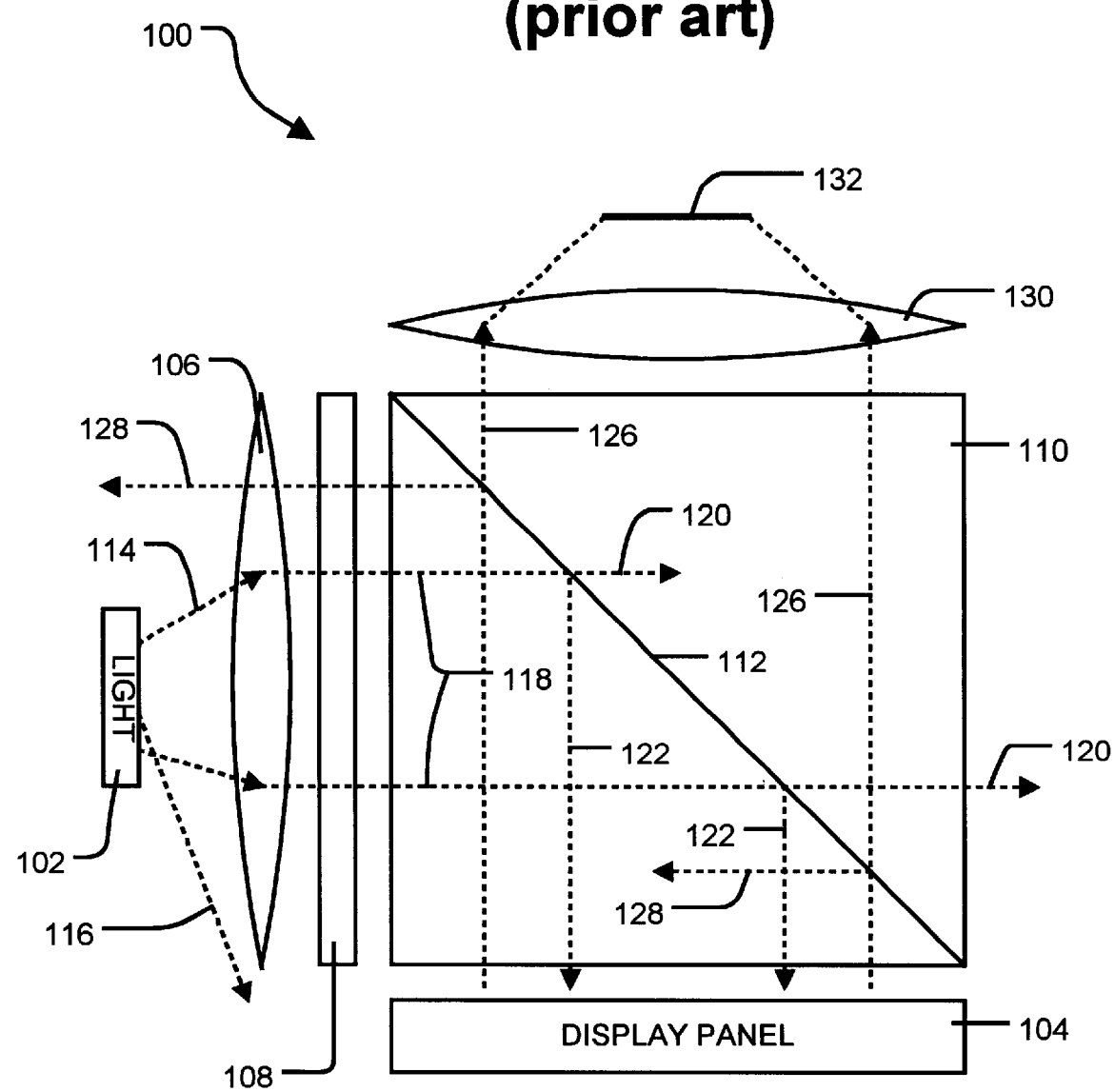
FIG. 1 is a sectional side view of a typical miniature display system of prior art.

As shown in the drawings for purposes of illustration, the present invention is embodied in a display system including light source for producing light, display panel, conic mirror, and conic polarized reflector. The display panel is preferably coplanar with the light source, allowing less bulky configuration as well as for easier manufacturing process. The conic mirror directs the light from the light source toward the conic polarized reflector (CPR). Because the conic mirror captures all of the light produced by the light source, collecting lens is not needed, reducing bulk and weight, and very little light is lost, improving efficiency. The CPR reflects the directed light toward the display panel.

Figure 2:
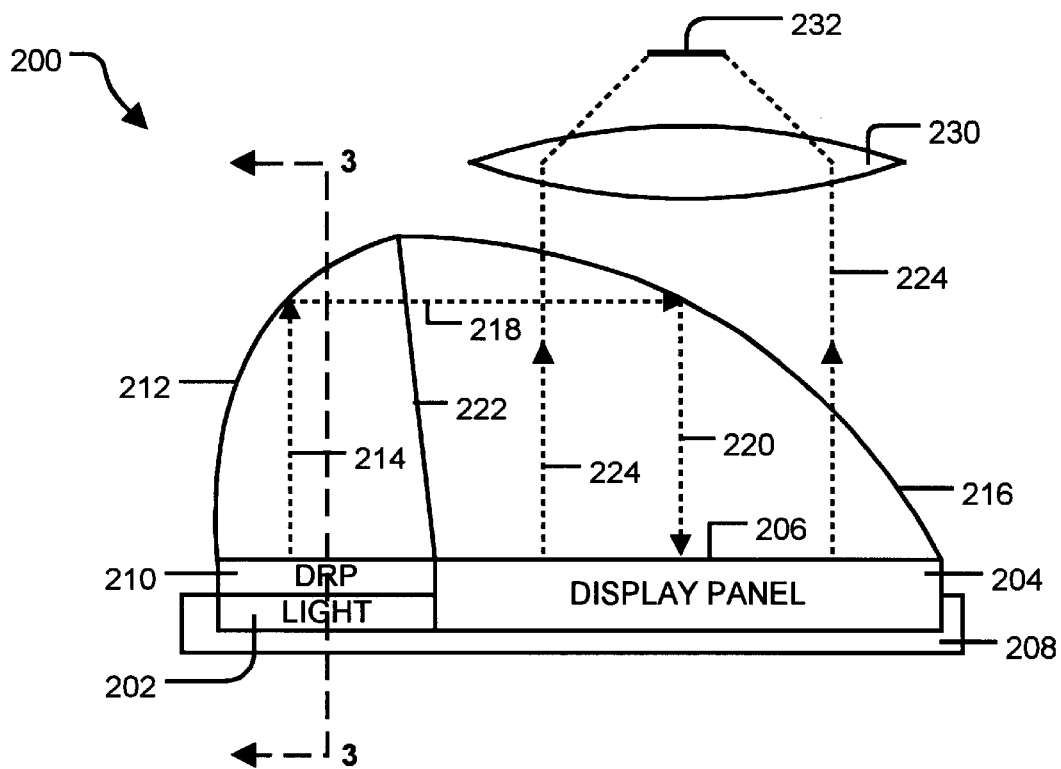
FIG. 2 is a sectional side view of a preferred embodiment of a display system of the present invention.
Figure 3:
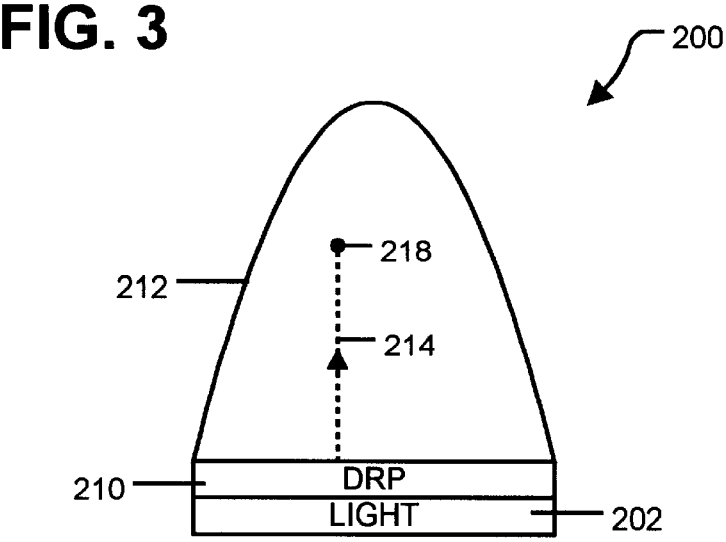
FIG. 3 is a sectional side view of the preferred embodiment of a display system 200 of the present invention viewed at the cross section 3—3 as illustrated in FIG. 2.

FIG. 2 shows a sectional side view of a preferred embodiment of a display system 200 of the present invention. FIG. 3 is a sectional side view of the preferred embodiment of a display system 200 of the present invention viewed at the cross section 3—3 as illustrated in FIG. 2. Referring to FIGS. 2 and 3, the display system 200 includes a light source 202 for supplying light and a display panel 204 for producing images on its surface ("display surface") 206. As illustrated, the light source 202 and the display panel 204 may be substantially coplanar. The light source 202 and the display panel 204 may be built on a single circuit board or substrate 208.

The light from the light source 202 may be filtered through diffuse reflective polarizer (DRP) 210. A separate diffuser may be used with the DRP 210. Alternatively, as in this example, the DRP 210 combines the functions of a diffuser and reflective polarizer. The DRP 210 diffuses the light to increase uniformity and passes light polarized in a first linear direction (for example, s-polarized light). Further, the DRP transforms, or rotates, light polarized in other directions (for example, p-polarized light) to light that favors s-polarization, thus increasing the intensity of s-polarized light passing the DRP 210. Any light not passed by the DRP 210 is reflected back toward the light source 202 and recycled. Accordingly, light 214 passing the DRP 210 is polarized in the first direction (s-polarized in the present example). S-polarization direction is orthogonal to p-polarization direction. Line 214 and other lines used below to illustrate direction of light are only used for clarity of discussion and are not intended to represent ray traces as is commonly used in the art of optics.

In a preferred embodiment, the DRP 220 consists of multiple layers of two types of film —birefringent and isotropic. Preferably, the birefringent index matches the isotropic index such that light traversing through the DRP encounters different properties of the DRP depending upon the polarity of the light. For example, s-polarized light may encounter constant index and pass through the DRP. In contrast, p-polarized light encounters Bragg grating and is reflected back. By doing so, the DRP passes s-polarized light and reflects p-polarized light to the light source 202 where it is recycled into s-polarized and p-polarized light, thereby increasing energy efficiency. In the DRP, there may be more than 100 layers of birefringent and isotropic film. And, the layers may be chirped. That is, the thickness of the layers may be changed across the stack to allow for broadband performance and to allow the DRP to maintain effectiveness even at large angles up to about 50 degrees. Various implementations of the DRP 220 are commercially available.

The light source 202 may be a LED (light-emitting diode) or an array of LED's. By turning the LED 202 into the state that is axis coincident with the preferred linear polarization (s-polarization in the current example), the light intensity for that polarization may be increased.

A conic mirror reflector 212 may be used to direct the s-polarized light 214 toward a polarized reflector 216. Due to the conical shape of the conic mirror reflector 212, all of the light 214 is captured and directed toward the polarized reflector 216. Interior surface of the conic mirror reflector 212 may be smooth or finely grated to increase diffusion. The conic mirror reflector 212 reflects all light introduced to it toward the polarized reflector 216.

The directed light 218 is then filtered by a linear polarizer 222. The linear polarizer' 222 removes all stray and non-optimally polarized light from reaching the display panel 204. The linear polarizer 222 may be but is not required to be the same material as the material used for the polarized reflector 216.

The polarized reflector 216 reflects the directed light 218 toward the display surface 206. Preferably, the polarized reflector 216 is shaped from film which is able to reflect light polarized in the first linear direction (s-polarized light in the present example) while allowing light polarized in the second, orthogonal direction (p-polarized light), to pass through. In a preferred embodiment, a polarized dual brightness enhancement film (DBEF) is used as the polarized reflector 216. DBEF's are commercially available from various sources including, but not limited to, 3M Company of Minneapolis, Minnesota.

The conic mirror reflector 212 and the polarized reflector 216 may be shaped to provide telecentricity and uniform illumination to the display surface 206. Accordingly, when the directed light 218 reflects on the polarized reflector 216 and heads for the display surface 206, the reflected light 220 impinges the display surface 206 perpendicular to the plane of the display surface 206.

In a preferred embodiment, the shape of the conic mirror reflector 212 may be described using the following polynomial equation:

$$z=cr^2/(1+sqrt(1-(1+k)c^2r^2))+sum\{A_i*r^{(2i)}\} \text{ where } i=1, 2, 3, \ldots$$

where $A_i$ is called aspherical coefficient, r is the radial coordinate in lens units, c is the curvature (reciprocal of the radius), and k is conic constant. If k and $A_i$ are zero, it is standard spherical surface. If c is also zero then it is flat surface.

In a preferred embodiment, the conic mirror reflector 212 is parabolic in shape and, using the above polynomial, has the following values:

$$k=-1; c=0.24; \text{ and } A_i=0.$$

The value of r is variable to be used to calculate the surface departure sag z.

Figure 4:
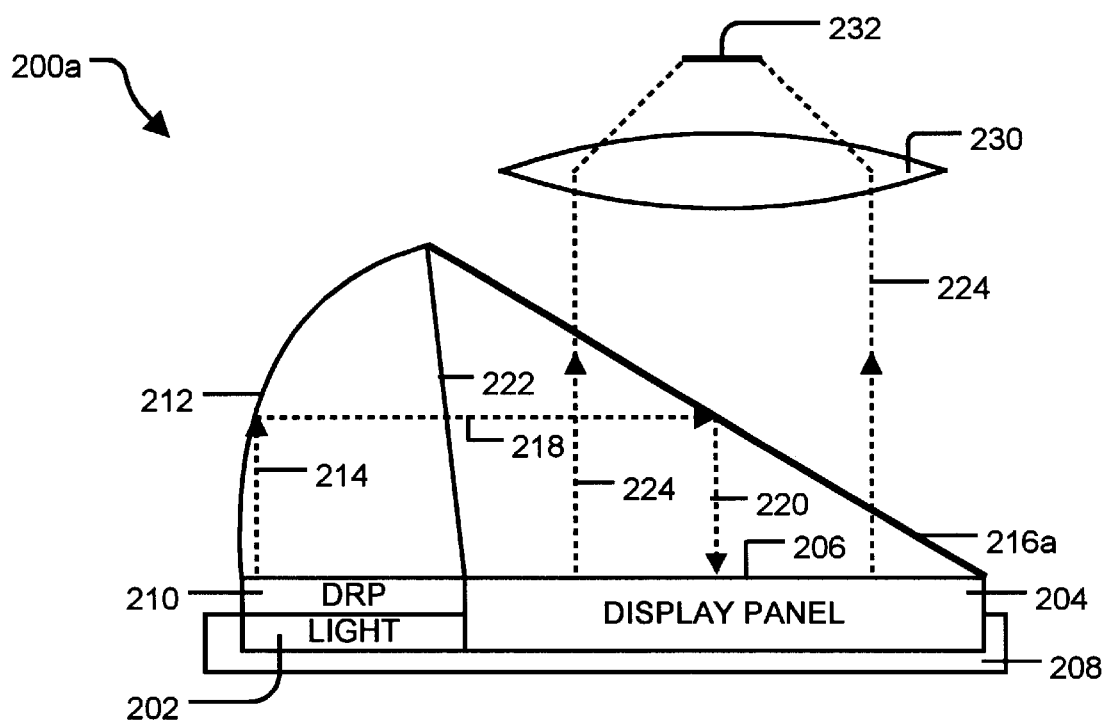
FIG. 4 is a sectional side view of another preferred embodiment of a display system of the present invention.

The polarized reflector 216 as illustrated in FIG. 2 is also parabolic in shape. Accordingly, the polynomial [A] may also be used to describe the shape of the polarized reflector 216. Alternatively, the polarized reflector 216a may be flat as illustrated in FIG. 4. FIG. 4 is a sectional side view of another preferred embodiment of a display system 200a of the present invention. The display system 200a of FIG. 4 is similar to the display system 200 of FIG. 2;

however, FIG. 4 shows a flat polarized reflector 216a.

Continuing to refer to FIGS. 2 and 3, as already discussed, the display surface 206 is preferably a reflective type and when light 220 reflects on the display surface 206, the light is rotated. In this present example, the s-polarized light 220 hits the display surface 206 and is patterned by the image on the display surface. And, the s-polarized light 220 is rotated to p-polarized light. The patterned and p-polarized light 224 pass through the polarized reflector 216 and reaches the imaging area 232 via an eye piece 230.

From the foregoing, it will be appreciated that the apparatus of the present invention is novel and offers advantages over the current art. The invention provides for a display system that is lighter, less bulky, and more energy efficient than the prior systems. Although several specific embodiments of the invention are described and illustrated above, the invention is not to be limited to the specific forms or arrangements of parts so described and illustrated. The present invention is limited only by the claims that follow.

What is claimed is:

1. A display system comprising:
   light source for producing light;
   display panel substantially coplanar with the light source;
   conic mirror for directing the light from the light source; and
   polarized reflector for reflecting the directed light from the conic mirror toward the display panel.

2. The display system of claim 1 further comprising a diffuse reflective polarizer (DRP) proximal to the light source.

3. The display system of claim 2 wherein the DRP comprises multiple layers of birefringent and isotropic films with matching indexes.

4. The display system of claim 1 wherein the light source and the display panel are attached to a single circuit board.

5. The display system of claim 1 wherein the light source is light-emitting diode (LED) placed axis coincident with a preferred linear polarization.

6. The display system of claim 1 wherein interior surface of the conic mirror is finely grated for diffusion of the light.

7. The display system of claim 1 further comprising linear polarizer placed between the conic mirror and the polarized reflector to filter the directed light.

8. The display system of claim 1 further comprising eye piece lens to focus patterned light reflecting off of the display panel.

9. A light reflector system for miniature display comprising:
   conic mirror shaped to capture light from a light source and to direct the light; and
   polarized reflector shaped to reflect the directed light from the conic mirror to telecentrically impinge on a display panel.

10. The light reflector system recited in claim 9 further comprising diffuse reflective polarizer (DRP) proximal to the light source for producing light polarized in a first direction.

11. The display system of claim 10 wherein the DRP comprises multiple layers of birefringent and isotropic films with matching indexes.

12. The display system of claim 9 wherein the polarized reflector is parabolic in shape.

13. The display system of claim 9 wherein interior surface of the conic mirror is finely grated for diffusion of the light.

14. The display system of claim 9 further comprising linear polarizer placed between the conic mirror and the polarized reflector to filter the directed light.

15. A display system comprising:
   light source for producing light;
   display panel for producing images,
   conic mirror for capturing and directing the light from the light source;
   linear polarizer filtering the directed light; and
   polarized reflector for reflecting filtered light toward the display panel such that the filtered light uniformly and telecentrically impinges the display panel.

16. The display system of claim 15 further comprising a diffuse reflective polarizer (DRP) proximal to the light source.

17. The display system of claim 16 wherein the DRP comprises multiple layers of birefringent and isotropic films with matching indexes.

18. The display system of claim 15 wherein the light source and the display panel are coplanar.

19. The display system of claim 15 wherein the light source is light-emitting diode (LED) placed axis coincident with a preferred linear polarization.

20. The display system of claim 15 wherein interior surface of the conic mirror is finely grated for diffusion of the light.

* * * * *